(12) United States Patent
Meissner

(10) Patent No.: US 9,797,704 B2
(45) Date of Patent: Oct. 24, 2017

(54) INTERFEROMETER HAVING TWO TRANSPARENT PLATES IN PARALLEL FOR MAKING REFERENCE AND MEASUREMENT BEAMS PARALLEL

(71) Applicant: DR. JOHANNES HEIDENHAIN GMBH, Traunreut (DE)

(72) Inventor: Markus Meissner, Übersee (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 180 days.

(21) Appl. No.: 14/809,107

(22) Filed: Jul. 24, 2015

(65) Prior Publication Data
US 2016/0033257 A1 Feb. 4, 2016

(30) Foreign Application Priority Data
Jul. 29, 2014 (DE) .................. 10 2014 214 839

(51) Int. Cl.
G01B 9/08 (2006.01)
G01B 9/02 (2006.01)
G01B 11/14 (2006.01)

(52) U.S. Cl.
CPC ..... *G01B 9/02015* (2013.01); *G01B 9/02018* (2013.01); *G01B 9/02061* (2013.01); *G01B 11/14* (2013.01); *G01B 2290/70* (2013.01)

(58) Field of Classification Search
CPC G01B 9/02015; G01B 11/14; G01B 9/02018; G01B 9/02061; G01B 2290/70
See application file for complete search history.

(56) References Cited

U.S. PATENT DOCUMENTS 4,746,216 A * 5/1988 Sommargren ......... G01B 11/26
356/485
4,752,133 A 6/1988 Sommargren
(Continued)

FOREIGN PATENT DOCUMENTS

DE 10317387 A1 11/2003
DE 102004049646 A1 4/2006

OTHER PUBLICATIONS

European Search Report issued in European Patent Application 15176437.0, dated Nov. 27, 2015.

*Primary Examiner* — Hwa Lee
(74) *Attorney, Agent, or Firm* — Andrews Kurth Kenyon LLP

(57) ABSTRACT

An interferometer includes a light source, a beam splitter, a reference reflector, a measuring reflector, a detection unit, and at least two transparent plane-parallel plates. The beam splitter splits a beam of rays into at least one measuring beam and at least one reference beam. Until being recombined, the measuring beam propagates in a measuring arm, and the reference beam propagates in a reference arm. The reference beam falls at least three times on the reference reflector located in the reference arm. The measuring reflector is disposed in the measuring arm and is joined to an object to be measured, which is movable along a measuring direction relative to the reference reflector. The measuring beam falls at least three times on the measuring reflector. At least one distance signal with regard to the position of the object to be measured is ascertainable from the interfering measuring and reference beams via the detection unit. The plane-parallel plates are disposed parallel to each other in the beam path between the light source and the detection unit. At least the measuring reflector is movable relative to the plane-parallel plates along the measuring direction. The plane-parallel plates each include a plurality of optical (Continued)

elements that exert such an optical effect on the measuring beam and the reference beam that they propagate parallel to each other in the direction of the measuring reflector and reference reflector, respectively.

15 Claims, 11 Drawing Sheets

(56) References Cited

U.S. PATENT DOCUMENTS

| | | | |
|---|---|---|---|
| 5,187,543 A * | 2/1993 | Ebert | G01D 5/266 356/487 |
| 6,806,960 B2 | 10/2004 | Bagwell et al. | |
| 6,897,962 B2 | 5/2005 | Johnstone et al. | |
| 7,542,149 B2 * | 6/2009 | Spanner | G01B 9/02027 356/492 |
| 8,004,749 B1 * | 8/2011 | Hsieh | G02F 2/00 356/477 |
| 8,797,546 B2 * | 8/2014 | Huber | G01B 11/026 356/498 |
| 2003/0197870 A1 * | 10/2003 | Bagwell | G01B 9/02007 356/493 |
| 2004/0047027 A1 * | 3/2004 | Carlson | G03F 7/70775 359/337.22 |
| 2004/0207853 A1 * | 10/2004 | Govorkov | G01J 9/0246 356/450 |
| 2006/0039005 A1 | 2/2006 | Fine et al. | |
| 2008/0117440 A1 | 5/2008 | Saendig | |
| 2012/0242994 A1 * | 9/2012 | Huber | G01B 11/026 356/450 |
| 2014/0376002 A1 * | 12/2014 | Meissner | G01B 9/02015 356/491 |

* cited by examiner

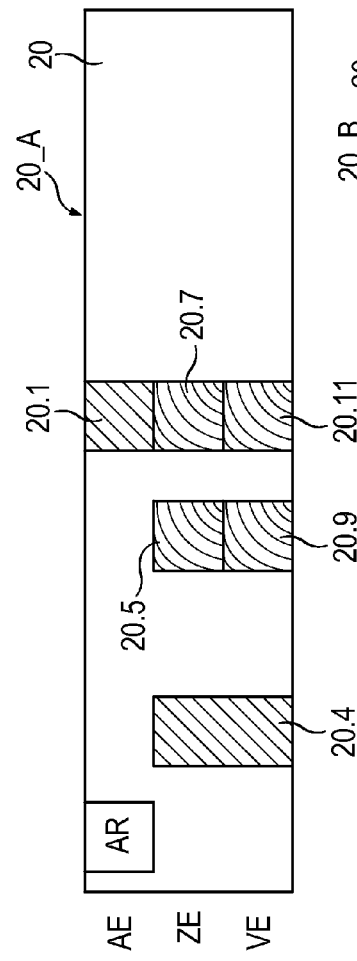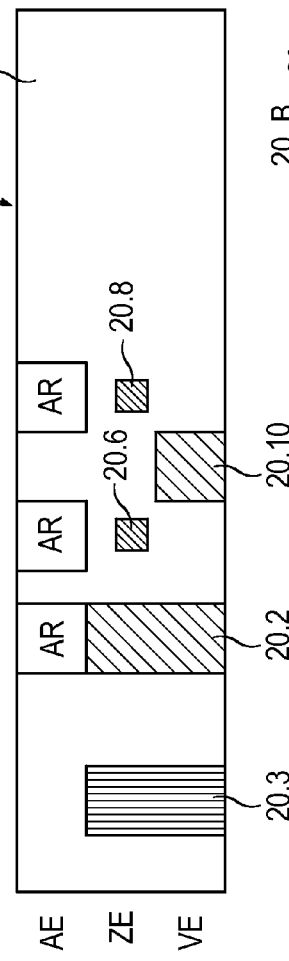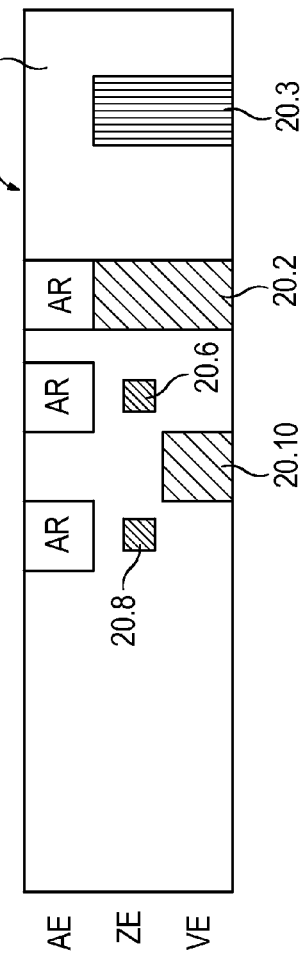

INTERFEROMETER HAVING TWO TRANSPARENT PLATES IN PARALLEL FOR MAKING REFERENCE AND MEASUREMENT BEAMS PARALLEL

CROSS-REFERENCE TO RELATED APPLICATIONS

The present application claims priority to application No. 10 2014 214 839.1, filed in the Federal Republic of Germany on Jul. 29, 2014, which is expressly incorporated herein in its entirety by reference thereto.

FIELD OF THE INVENTION

The present invention relates to an interferometer, for example, that is particularly suitable for the high-precision measurement of length and/or distance.

BACKGROUND INFORMATION

A so-called plane-mirror interferometer is described, for example, in U.S. Pat. No. 4,752,133. It includes a light source, a first beam splitter, and a detection unit. A beam of rays emitted by the light source is split via the first beam splitter into at least one measuring beam and at least one reference beam. The measuring beam and the reference beam then propagate in a measuring arm and in a reference arm, respectively, until they are recombined at the beam splitter. In the measuring arm, a measuring reflector in the form of a plane mirror is disposed on a movable object to be measured. The reference arm has at least one reference reflector. With the aid of the detection unit, at least one distance signal is ascertainable from the recombined interfering measuring and reference beams with regard to the position of the object to be measured.

A polarization beam splitter cube is provided as a beam splitter in U.S. Pat. No. 4,752,133. As a reference reflector, a plane mirror is used that is situated between the measuring beams. The combined triple prism of the reference arm and measuring arm is adhered onto or wrung to the beam-splitter cube. In addition, the triple prism may also be placed spatially separate from the beam-splitter cube.

It is considered to be disadvantageous with regard to such interferometers that both the polarization beam-splitter cube and the triple prism can only be produced with great expense. Thus, in the case of the beam-splitter cube, the various sides must be aligned highly exactly relative to each other, especially if one or more triple prisms and possibly further optical components are disposed directly thereon. In the case of the spatially separate placement of beam-splitter cube and triple prisms, a likewise very costly low-drift mounting of these components is necessary. In addition, if great tilt tolerances of the object to be measured are demanded, the triple prism must have a relatively large construction.

SUMMARY

Example embodiments of the present invention provide a compactly constructed interferometer that has optical components which are as simple to produce as possible.

According to an example embodiment of the present invention, an interferometer includes:
a light source;
a first beam splitter that splits a beam of rays, emitted by the light source, into at least one measuring beam and at least one reference beam, via which a splitting plane is defined, and the measuring beam propagating in a measuring arm and the reference beam propagating in a reference arm until being recombined at a recombining location in a recombining plane, the recombining plane being oriented parallel to the splitting plane;
a reference reflector disposed in the reference arm, the reference beam falling at least three times on the reference reflector;
a measuring reflector, that is disposed in the measuring arm and is joined to an object to be measured, which is movable along a measuring direction relative to the reference reflector, and the measuring beam falling at least three times on the measuring reflector;
a detection unit, via which at least one distance signal with regard to the position of the object to be measured is ascertainable from the interfering measuring and reference beams superposed at the recombining location; and
at least two transparent plane-parallel plates that are disposed parallel to each other in the beam path between the light source and the detection unit, at least the measuring reflector being movable relative to the plane-parallel plates along the measuring direction, and the plane-parallel plates each including a plurality of optical elements that exert such an optical effect on the measuring beam and the reference beam that the measuring beam and the reference beam propagate parallel to each other in the direction of the measuring reflector and reference reflector, respectively.

A plurality of reflectors and at least four imaging optical systems for the measuring beam and the reference beam may be provided as optical elements in the two plane-parallel plates, with:
two imaging optical systems in each case displacing the measuring beam and the reference beam from the splitting plane to an intermediate plane that is located between the splitting plane and the recombining plane and is oriented parallel to them; and
two further imaging optical systems in each case displacing the measuring beam and the reference beam from the intermediate plane to the recombining plane.

Two plane-parallel plates may be provided, with:
a first imaging optical system for the measuring beam being disposed in the second plane-parallel plate;
a second imaging optical system for the measuring beam being disposed in the first plane-parallel plate;
a third imaging optical system for the reference beam being disposed in the second plane-parallel plate;
a fourth imaging optical system for the reference beam being disposed in the first plane-parallel plate;
the first and third imaging optical systems increasing the entrance-beam diameter of the beam of rays falling on them; and
the second and fourth imaging optical systems reducing the beam diameter of the beam of rays falling on them to the entrance-beam diameter.

In this context, the imaging optical systems may in each case include two reflective grating lenses situated on one side of a plane-parallel plate and a reflector located on the opposite side of the plane-parallel plate, the reflecting sides of the grating lenses and of the reflector facing one another.

In this connection, it is possible that:
the first imaging optical system:
has a first grating lens and a second grating lens, both of which are disposed on one side of the second plane-parallel plate; and has a first reflector situated on the opposite side of the second plane-parallel plate;
the first imaging optical system doubling the entrance-beam diameter of the measuring beam falling on it, and that:
the second imaging optical system:
has a third grating lens and a fourth grating lens, both of which are disposed on one side of the first plane-parallel plate; and
has a second reflector situated on the opposite side of the first plane-parallel plate;
the second imaging optical system halving the beam diameter of the measuring beam falling on it; and that:
the third imaging optical system:
has a fifth grating lens and a sixth grating lens, both of which are disposed on one side of the second plane-parallel plate; and
has a third reflector situated on the opposite side of the second plane-parallel plate;
the third imaging optical system doubling the entrance-beam diameter of the reference beam falling on it; and that
the fourth imaging optical system:
has a seventh grating lens and an eighth grating lens, both of which are disposed on one side of the first plane-parallel plate; and
has a fourth reflector situated on the opposite side of the first plane-parallel plate;
the fourth imaging optical system halving the beam diameter of the reference beam falling on it.

The first, fourth, fifth, and eighth grating lenses may each have a first focal length, and the second, third, sixth, and seventh grating lenses may each have a second focal length that is twice as great as the first focal length.

In addition, the interferometer may include three plane-parallel plates set apart in the beam propagation direction, with:
a first imaging optical system for the measuring beam being formed in the second and third plane-parallel plates;
a second imaging optical system for the measuring beam being formed in the second and third plane-parallel plates;
a third imaging optical system for the reference beam being formed in the first and second plane-parallel plates;
a fourth imaging optical system for the reference beam being formed in the first and second plane-parallel plates;
the first and third imaging optical systems increasing the entrance-beam diameter of the beam of rays falling on them; and
the second and fourth imaging optical systems reducing the beam diameter of the beam of rays falling on them to the entrance-beam diameter.

In this context, the imaging optical systems may in each case include two reflective grating lenses situated on one plane-parallel plate and a reflector located on the opposite plane-parallel plate, the reflecting sides of the grating lenses and of the reflector facing one another.

In this connection, it is possible that
the first imaging optical system:
has a first grating lens and a second grating lens, both of which are disposed on the third plane-parallel plate; and
has a first reflector located on the second plane-parallel plate;
the first imaging optical system doubling the entrance-beam diameter of the measuring beam falling on it; and that:
the second imaging optical system:
has a third grating lens and a fourth grating lens, both of which are disposed on the first plane-parallel plate; and
has a second reflector located on the second plane-parallel plate;
the second imaging optical system halving the beam diameter of the measuring beam falling on it; and that:
the third imaging optical system:
has a fifth grating lens and a sixth grating lens, both of which are disposed on the third plane-parallel plate; and
has a third reflector located on the second plane-parallel plate;
the third imaging optical system doubling the entrance-beam diameter of the reference beam falling on it; and that:
the fourth imaging optical system:
has a seventh grating lens and an eighth grating lens, both of which are disposed on the first plane-parallel plate; and
has a fourth reflector located on the second plane-parallel plate;
the fourth imaging optical system halving the beam diameter of the reference beam falling on it.

The first, fourth, fifth, and eighth grating lenses each have a first focal length, and the second, third, sixth, and seventh grating lenses each have a second focal length that is twice as great as the first focal length.

In addition, it is possible that the first beam splitter is formed on the second plane-parallel plate as a grating or as a polarization-optical beam-splitter layer, which in each case is situated on a side of the second plane-parallel plate that is oriented in the direction of the first plane-parallel plate.

It may further be provided that the measuring reflector and the reference reflector each take the form of a plane-mirror reflector.

A delay section may be formed in the beam path of the measuring beam such that between being split and being recombined, the measuring beam and the reference beam traverse identical optical travel distances in air and in the plane-parallel plates.

Moreover, it may be provided that:
in the second impingement, the measuring beam falls with normal incidence onto the measuring reflector; and
in the second impingement, the reference beam falls with normal incidence onto the reference reflector.

It is further possible that between the plane-parallel plates, spacers are disposed that have cutouts in the area of the measuring and reference beams propagating between the plane-parallel plates.

According to example embodiments of the present invention, costly production of a beam-splitter cube and one or more triple prisms may be eliminated. Furthermore, according to example embodiments of the present invention, only plane-parallel plates, on which suitable optical elements are disposed, may be necessary to implement the optical functionality of a beam-splitter cube and triple prisms in the beam paths. Such plane-parallel plates, including the elements on them, may be produced simply and inexpensively using suitable lithography processes. In particular, the troublesome polishing of 90° angles may no longer be necessary. The adhesives in optically relevant areas of the beam paths necessary in conventional systems or the wringing of optical elements may also be omitted. Moreover, the painstaking, low-drift positioning of optical components in the beam paths may also no longer be necessary.

In addition, in the event the measuring reflector and/or the reference reflector tilts or is displaced from its respective nominal position, it is ensured in the interferometer described herein, that a resulting shear of the measuring beam and/or reference beam is compensated for intrinsically to some extent. No decrease in the degree of modulation in the signals generated results in these cases, either.

Moreover, the parallel guidance of the measuring beam and the reference beam in the direction of the associated measuring reflector and reference reflector, respectively, permits them to be separate geometrically from each other, and such being the case, the relative position of objects is measurable at various levels.

Further features and aspects of example embodiments of the present invention are described in more detail below with reference to the appended Figures.

BRIEF DESCRIPTION OF THE DRAWINGS

FIGS. 3a to 3c are plan views from different directions of the other of the two plane-parallel plates of the interferometer according to the first example embodiment of the present invention.

DETAILED DESCRIPTION

An interferometer according to a first example embodiment of the present invention is described below with reference to FIG. 1a to 1d, 2a to 2c, and 3a to 3c. FIGS. 1a to 1d are different views of the beam path, and FIGS. 2a to 2c and 3a to 3c are plan views of different sides of the plane-parallel plates used, having the optical elements disposed on them.

Figure 1A:
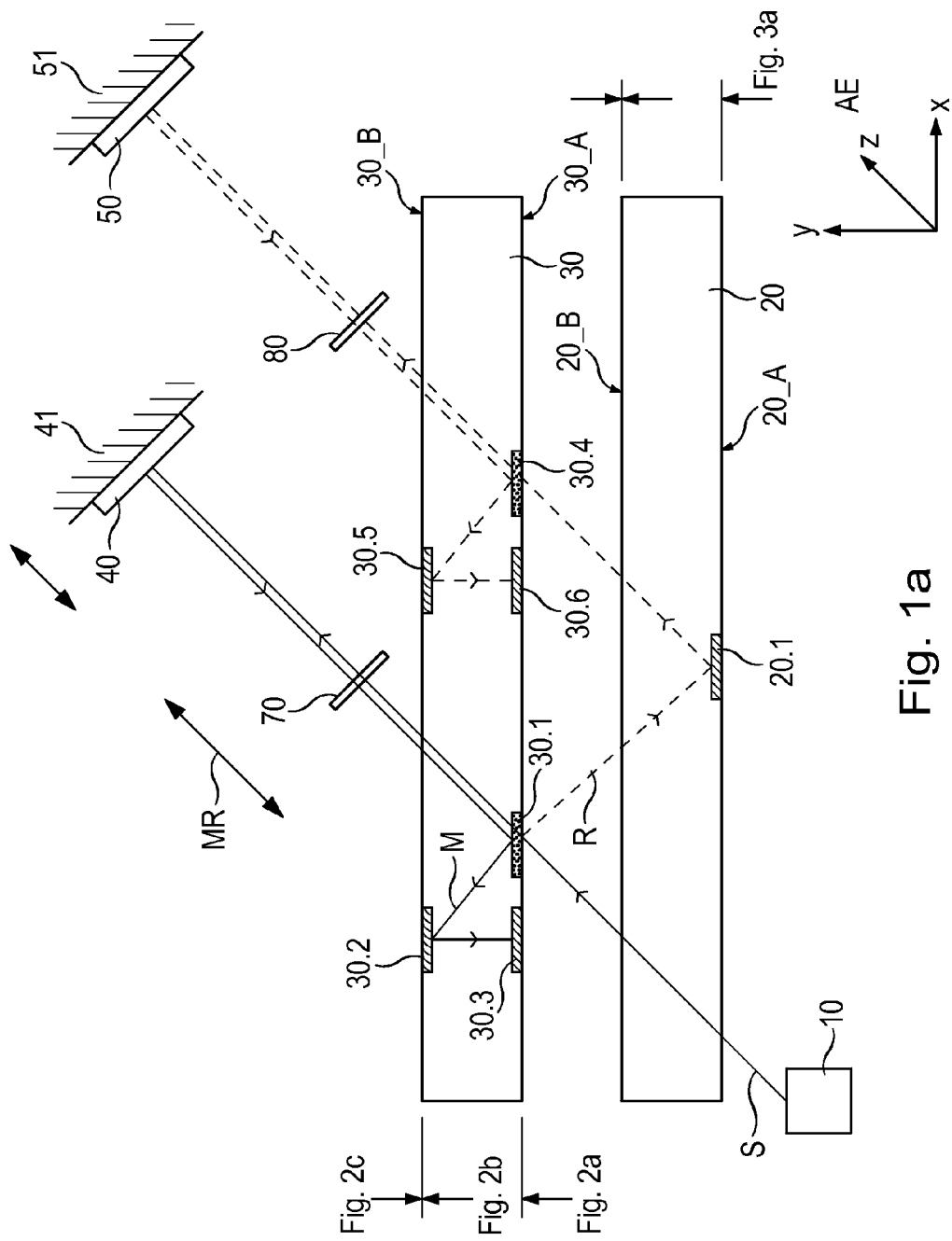
FIG. 1a illustrates the beam path of an interferometer according to a first example embodiment of the present invention in the splitting plane.
Figure 1B:
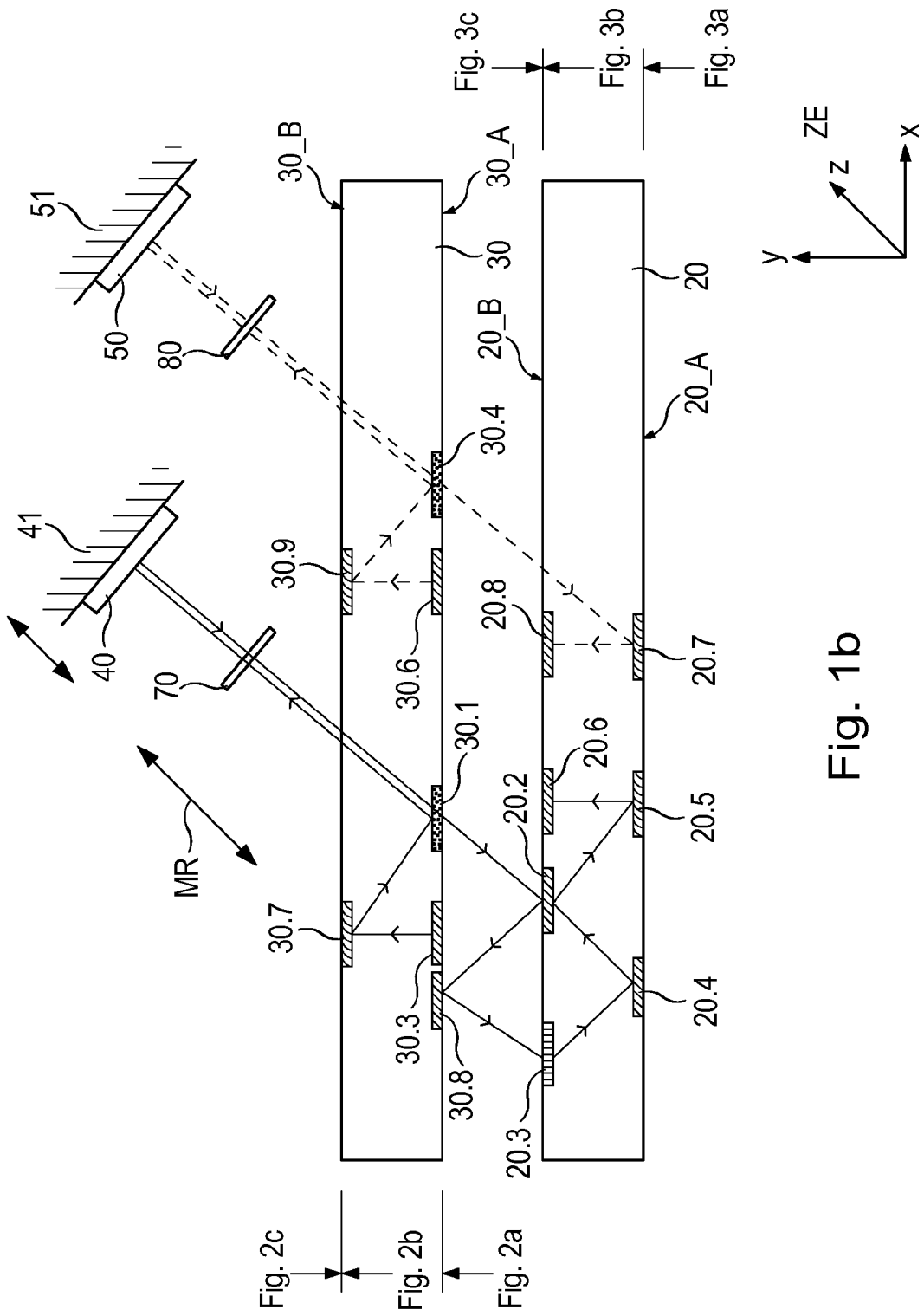
FIG. 1b illustrates the beam path of the interferometer according to the first example embodiment of the present invention in the intermediate plane.
Figure 1C:
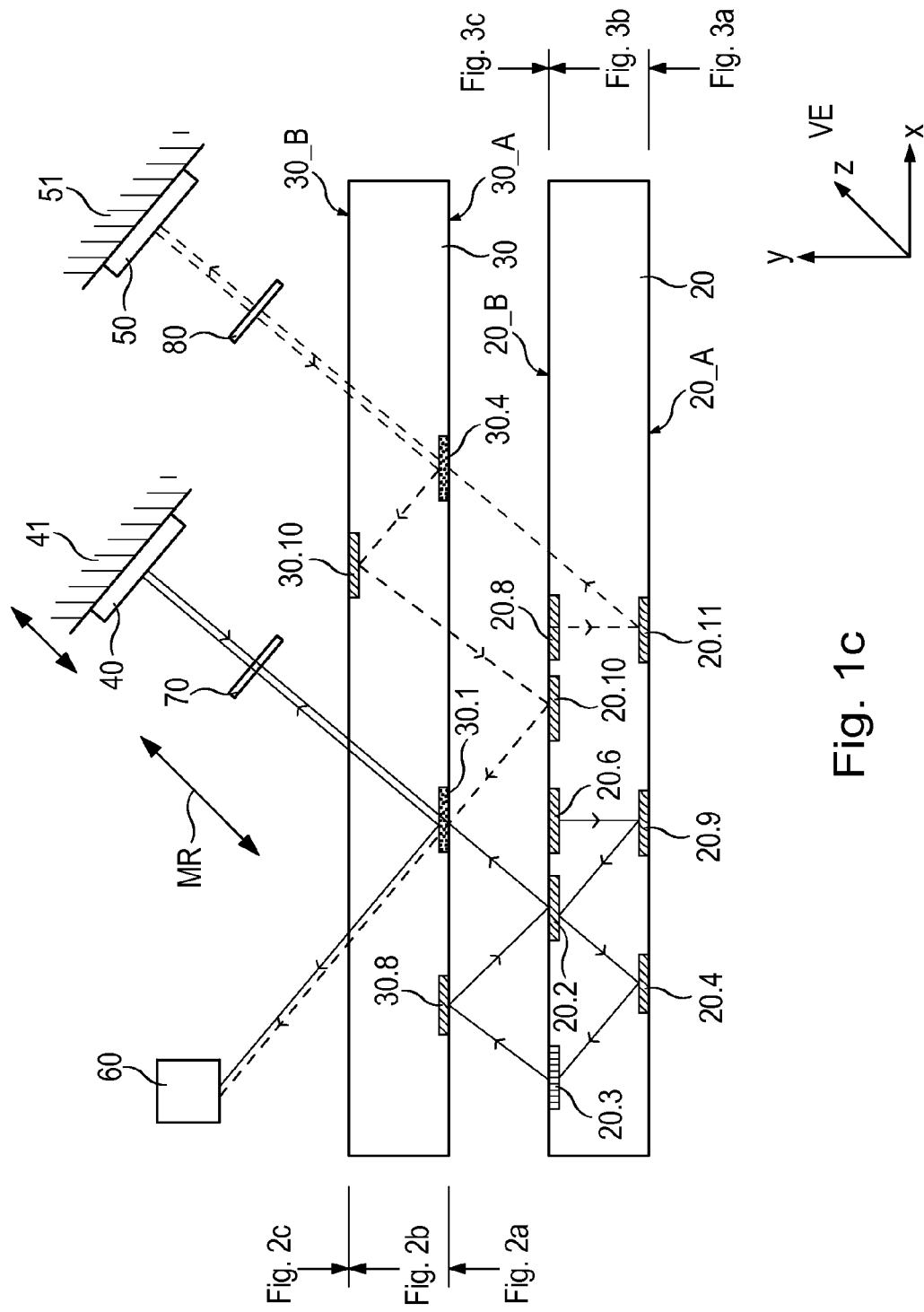
FIG. 1c illustrates the beam path of the interferometer according to the first example embodiment of the present invention in the recombining plane.
Figure 1D:
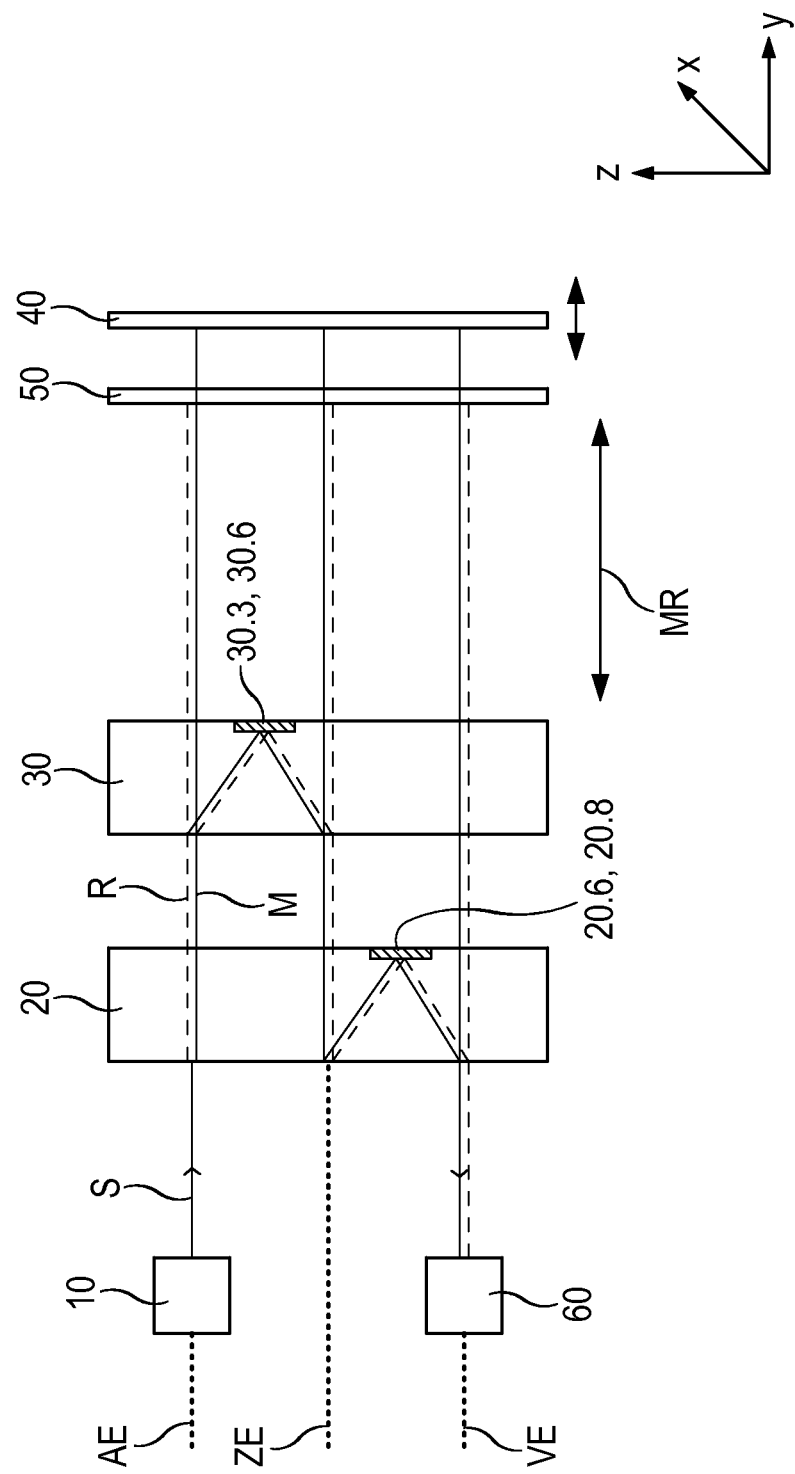
FIG. 1d illustrates the beam path of the interferometer according to the first example embodiment of the present invention in a further view.
Figure 2A:
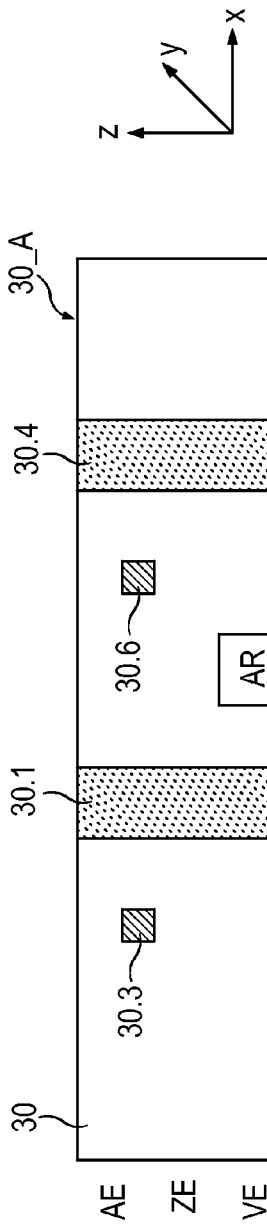
FIGS. 2a to 2c are plan views from different directions of one of the two plane-parallel plates of the interferometer according to the first example embodiment of the present invention.
Figure 2B:
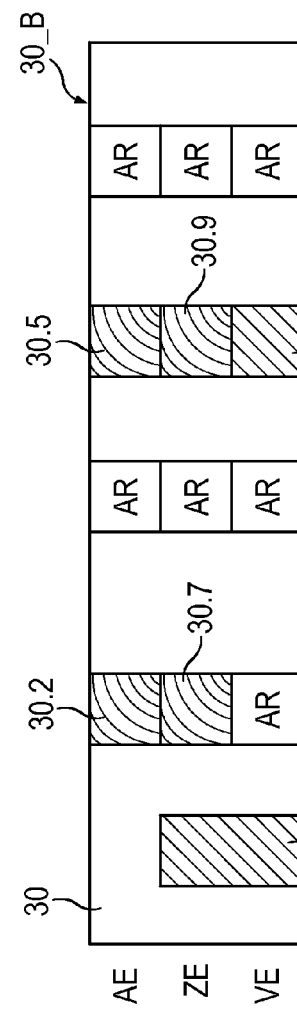
Figure 2C:
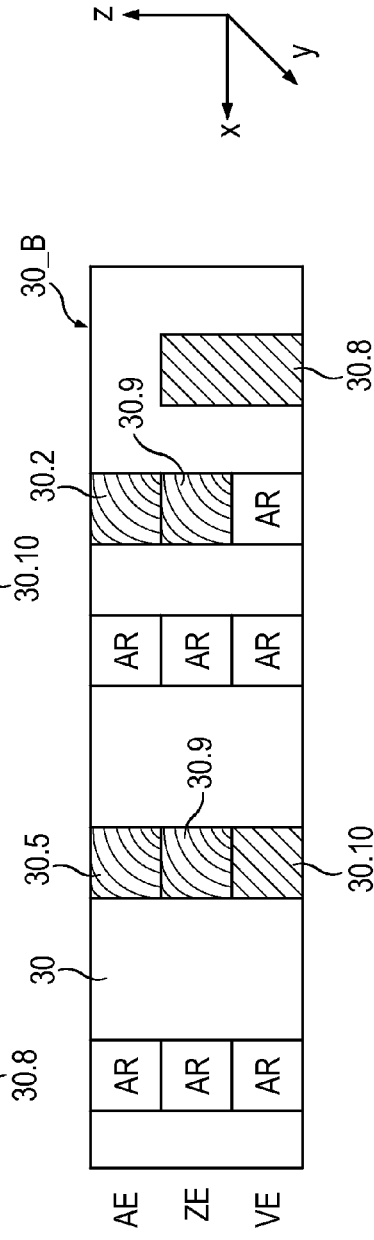
Figure 4A:
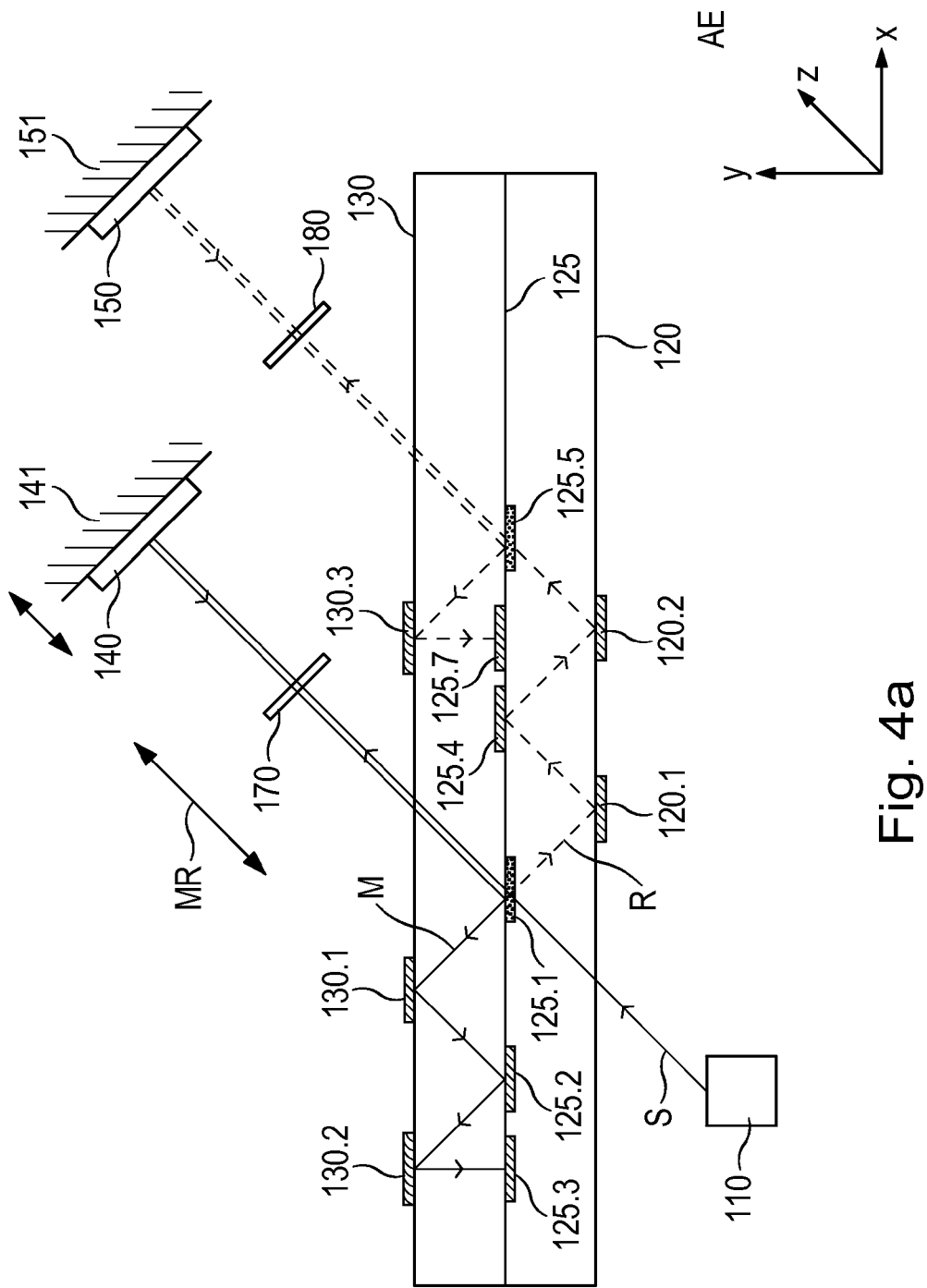
FIG. 4a illustrates the beam path of an interferometer according to a second example embodiment of the present invention in the splitting plane.
Figure 4B:
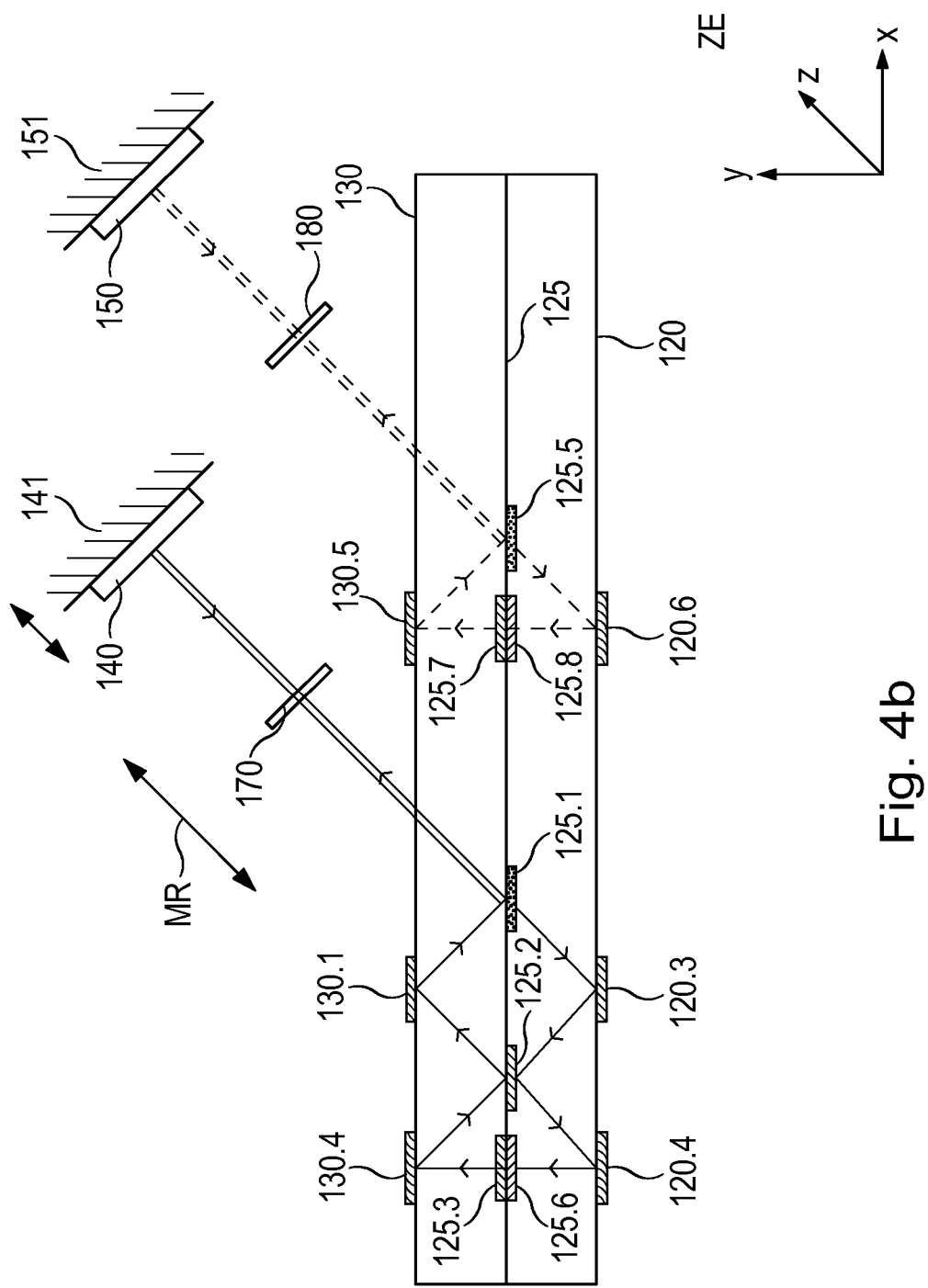
FIG. 4b illustrates the beam path of the interferometer according to the second example embodiment of the present invention in the intermediate plane.
Figure 4C:
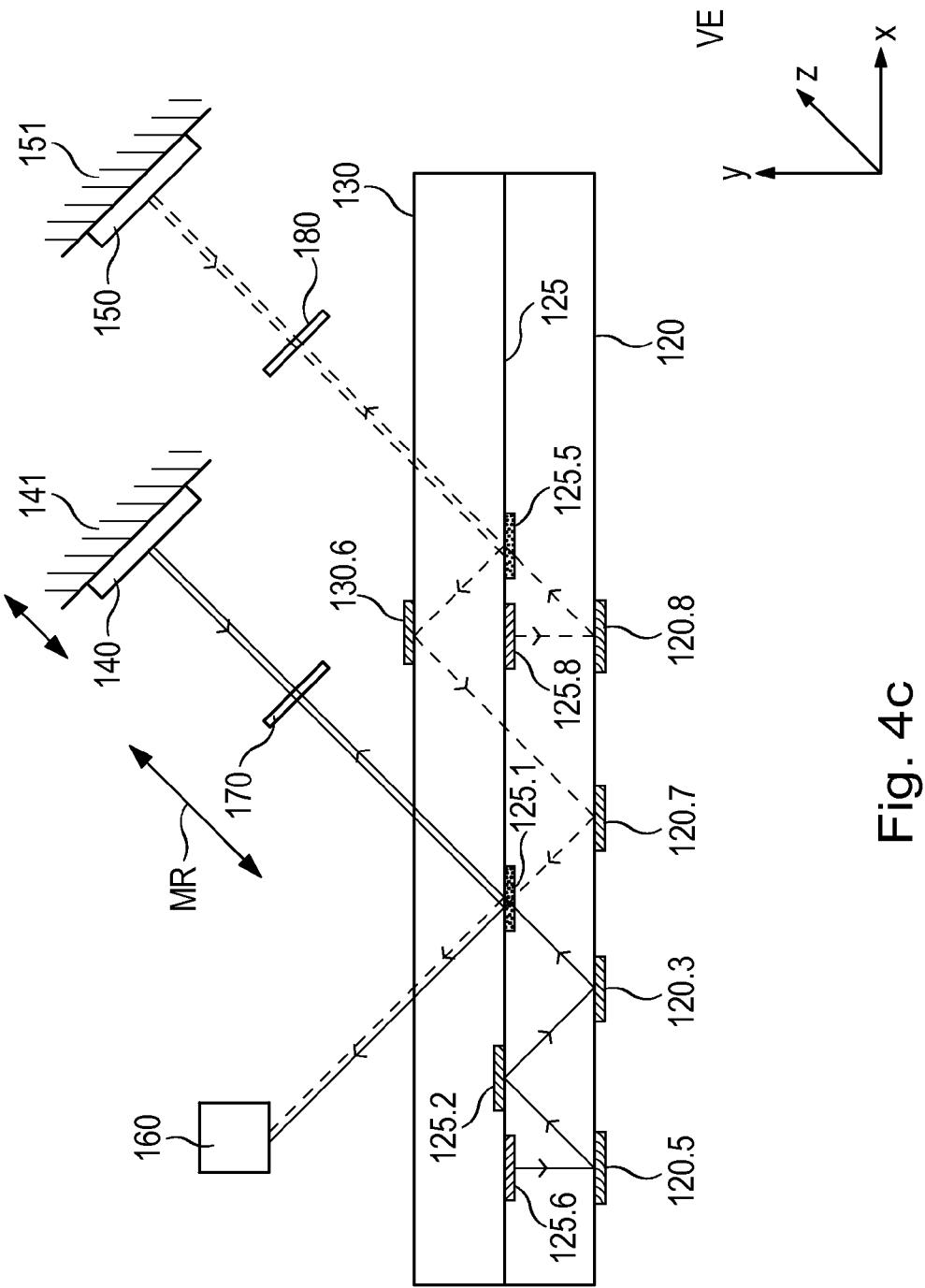
FIG. 4c illustrates the beam path of the interferometer according to the second example embodiment of the present invention in the recombining plane.
Figure 4D:
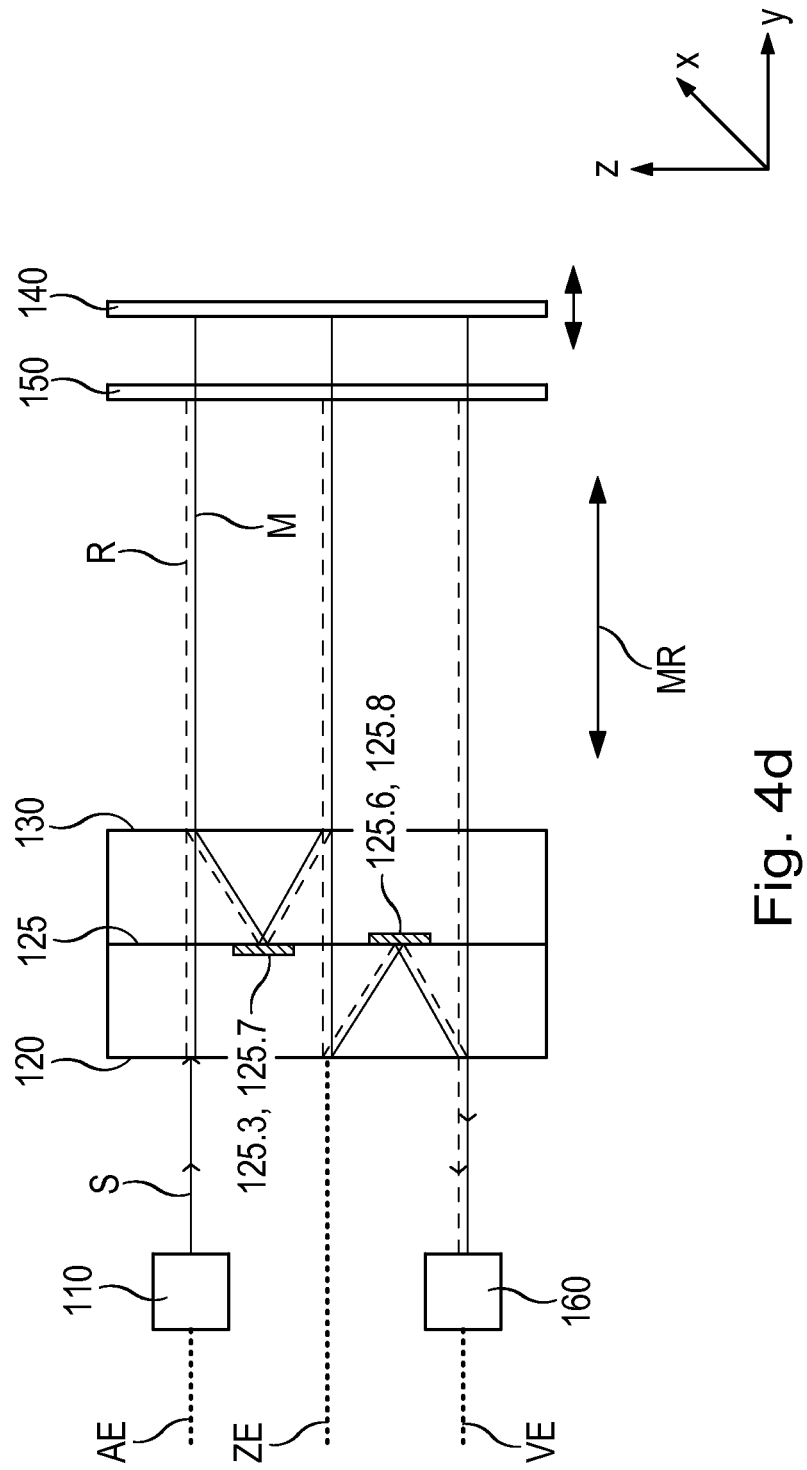
FIG. 4d illustrates the beam path of the interferometer according to the second example embodiment of the present invention in a further view.
Figures 5A, 5B, 5C:
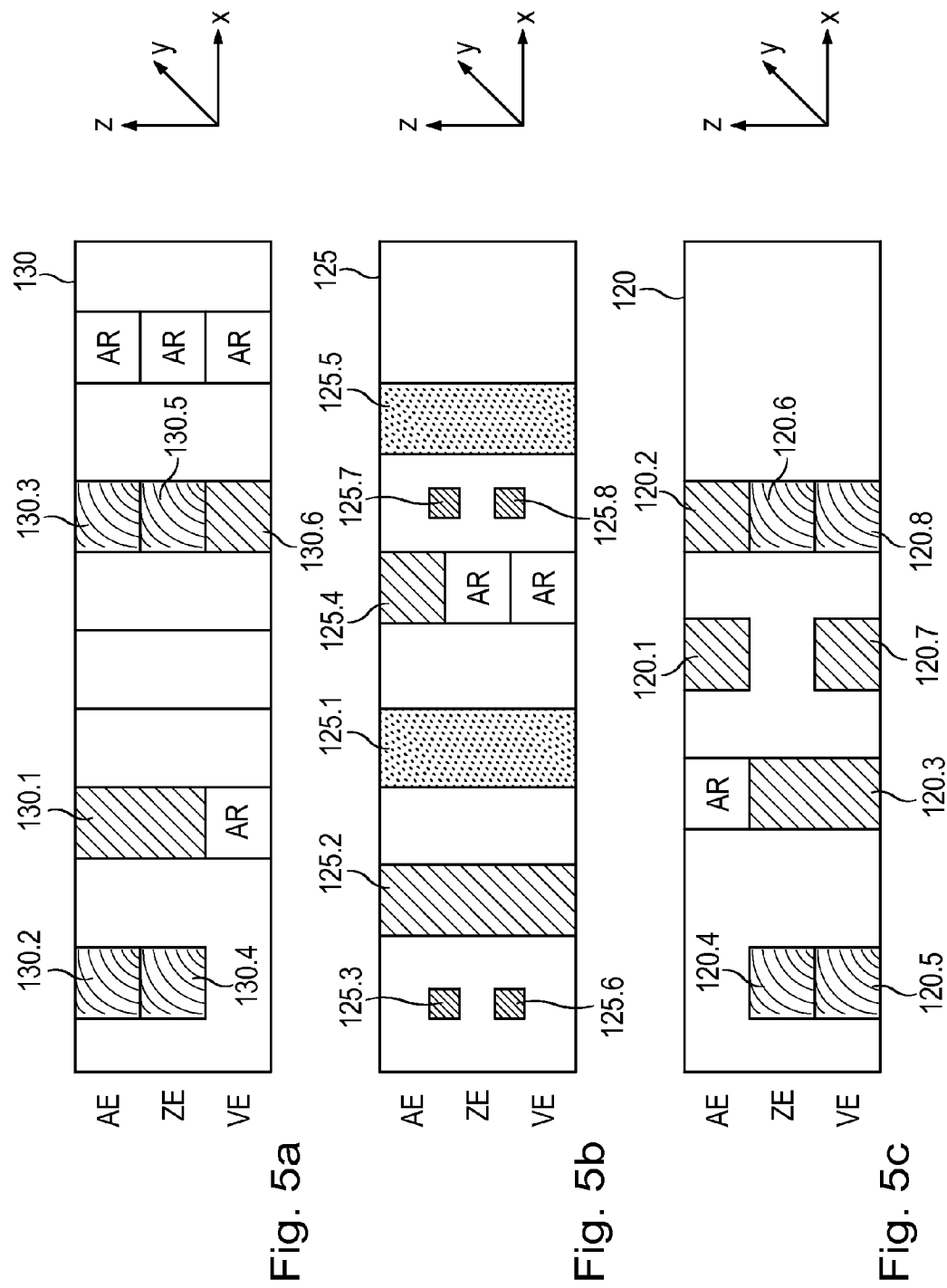
FIGS. 5a to 5c are plan views of the thin plane-parallel plates used in the interferometer according to the second example embodiment of the present invention.

The interferometer includes at least one light source 10, a first beam splitter 30.1, a measuring reflector 40, a reference reflector 50, a detection unit 60, and at least two transparent plane-parallel plates 20, 30. Lower plane-parallel plate 20 in each of FIGS. 1a to 1c is referred to hereinafter as first plane-parallel plate 20, and upper plane-parallel plate 30 is referred to as second plane-parallel plate. The two plane-parallel plates 20, 30, which are produced from a suitable glass material, for example, are disposed parallel to one another at a specific distance in the beam path between light source 10 and detection unit 60. As illustrated in FIGS. 1a to 1c, in addition, the two plane-parallel plates 20, 30 are arranged in non-parallel fashion with respect to measuring reflector 40, i.e., at an angle unequal to 90° relative to the direction of incidence of beam of rays S emitted by the light source.

The two plane-parallel plates 20, 30 may have a length, for example, of approximately 10 to 15 cm in the x-direction indicated, a width of approximately 1 to 3 cm along the y-direction, and a thickness of approximately 3 to 5 cm along the z-direction. The spacing of the two plane-parallel plates 20, 30 amounts, for example, to approximately 1 to 2 cm.

Measuring reflector 40, disposed in a measuring arm and taking the form of a plane-mirror reflector, is joined to an object to be measured 41, that is disposed in a manner allowing movement along a measuring direction MR relative to the remaining interferometer components. In the present example, measuring direction MR corresponds to the beam-propagation direction between plane-parallel plates 20, 30 and measuring reflector 40, and therefore extends from the bottom left to the top right in FIGS. 1a to 1c.

For example, the object to be measured 41 may be a machine part such as a table of a lithography device, for example, which is disposed in a manner allowing movement along measuring direction MR. With the aid of the interferometer, at least one distance signal is able to be ascertained with regard to a movement of object to be measured 41 along measuring direction MR. This distance signal may be used by a control unit to position the machine part, for example.

Disposed in a reference arm, as illustrated in FIGS. 1a to 1c, is a reference reflector 50 that likewise takes the form of a plane-mirror reflector and is joined to an object 51. Object 51 may be arranged so that it is stationary along measuring direction MR as opposed to movable object to be measured 41 in the corresponding machine.

In this context, with regard to the arrangement of measuring reflector 40 and reference reflector 50, relative movement is provided between corresponding objects 41, 51 or measuring reflector 40 and reference reflector 50, respectively, along measuring direction MR. As an alternative to the variant illustrated, it is also be possible, for example, that measuring reflector 40 is stationary and reference reflector 50 is movable, etc.

As additionally illustrated in FIGS. 1a to 1c, starting from second plane-parallel plate 30 in the interferometer, the measuring arm and the reference arm extend parallel to each other along measuring direction MR. Thus, measuring beam M and reference beam R propagate parallel to each other in the direction of measuring reflector 40 and reference reflector 50. This is ensured by the optical powers of a number of optical elements in plane-parallel plates 20, 30, as explained in more detail below. In particular, because of this orientation of the measuring arm and reference arm, it is possible to extremely precisely ascertain changes in distance between highly diverse machine parts movable relative to each other.

The beam paths in the measuring arm and reference arm of the interferometer for generating the at least one distance signal in the first exemplary embodiment are further described with reference to FIGS. 1a to 1c, 2a to 2c, and 3a to 3c.

As illustrated in FIG. 1a, a light source 10, e.g., a suitable laser, emits a beam of rays S having linear polarization. Beam of rays S propagates in a first plane, which is referred to hereinafter as splitting plane AE and which coincides with the drawing plane of FIG. 1a. Beam of rays S initially passes through first transparent plane-parallel plate 20 and propagates further in the direction of second plane-parallel plate 30. In FIGS. 3a to 3c, which show plan views of first side 20_A and second side 20_B of first plane-parallel plate 20, the areas in which beam of rays S enters into first plane-parallel plate 20 and emerges from it again are denoted by AR. An anti-reflective coating may be applied thereon.

On second plane-parallel plate 30, beam of rays S then strikes first beam splitter 30.1, which is in the form of a polarization-optical beam-splitter layer located on the side of second plane-parallel plate 30 that is oriented in the direction of first plane-parallel plate 20. Hereinafter, this side is referred to as first side 30_A of second plane-parallel plate 30. Alternatively, it is also possible to form first beam splitter 30.1 as a grating that has a grating period that is smaller than the wavelength of light source 10 used. First beam splitter 30.1 splits beam of rays S falling on it into at least one measuring beam M and at least one reference beam R. Because of the polarization angle provided for beam of rays S of approximately 45° in terms of first beam splitter 30.1, split beams of rays M, R have the same intensity upon interference. In each instance, both beams of rays M, R have a linear polarization, the polarizing directions in measuring and reference beams M, R being oriented orthogonally relative to each other. Split beams of rays M, R define splitting plane AE, which coincides with the drawing plane in FIG. 1a. Starting from the resultant splitting at first beam splitter 30.1, FIGS. 1a to 1d illustrate measuring beam M with a solid line and reference beam R, on the other hand, with a dotted line. Measuring beam M propagates in a measuring arm and reference beam R propagates in a reference arm until being recombined at a recombining location in a recombining plane VE, which coincides with the drawing plane of FIG. 1c. Recombining plane VE is offset in the z-direction and is parallel to splitting plane AE.

The linearly polarized beam of rays allowed to pass through by first beam splitter 30.1 forms measuring beam M. The beam of rays, linearly polarized orthogonally thereto, reflected by beam splitter 30.1 acts as reference beam R.

In the measuring arm, linearly polarized measuring beam M transmitted at first beam splitter 30.1 first of all traverses second plane-parallel plate 30, and after leaving plane-parallel plate 30 via second side 30_B, then propagates a first time in the direction of measuring reflector 40. A γ/4-plate 70 is located in the beam path of measuring beam M between second plane-parallel plate 30 and measuring reflector 40. After being reflected back at measuring reflector 40 and the second traversal of γ/4-plate 70, measuring beam M has a polarization rotated by 90° and is reflected by first beam splitter 30.1 in the direction of second side 30_B of second plane-parallel plate 30.

In second plane-parallel plate 30, measuring beam M subsequently passes through a first imaging optical system which is formed by a first reflecting grating lens 30.2 on second side 30_B, a first reflector 30.3 on first side 30_A, and a second reflecting grating lens 30.7 on second side 30_B of plane-parallel plate 30. In this context, first grating lens 30.2 in splitting plane AE has a first focal length f, and second grating lens 30.7 in intermediate plane ZE (FIG. 1b) has a second focal length 2f which in the present exemplary embodiment, is twice as great as first focal length f. Moreover, distance d between sides 30_A and 30_B of plane-parallel plate 30, which corresponds to the thickness of plane-parallel plate 30, amounts to d=(f+2f)/2. At the output of the first imaging optical system, after second grating lens 30.7, e.g., in intermediate plane ZE, a measuring beam M results having a beam diameter double that of the entrance-beam diameter. Measuring beam M then propagates again in the direction of beam splitter 30.1, and is reflected by it toward measuring reflector 40, which is acted upon with normal incidence in the second impingement.

The first imaging optical system in second plane-parallel plate 30 thus brings about a displacement of measuring beam M from splitting plane AE via reflector 30.3 to intermediate plane ZE. In addition, the entrance-beam diameter of measuring beam M falling thereon is thereby increased. For example, with the selected focal lengths f, 2f of grating lenses 30.2, 30.7, a doubling of the entrance-beam diameter of measuring beam M results.

According to the representation of the beam path in intermediate plane ZE illustrated in FIG. 1b, after the second reflection of measuring beam M at measuring reflector 40, the passage twice through γ/4-plate 70 and the new change in its state of polarization thereby resulting, measuring beam M is transmitted by first beam splitter 30.1 and propagates further in the direction of first plane-parallel plate 20. On its second side 20_B, measuring beam M strikes a reflector 20.2, by which it is reflected in the direction of second plane-parallel plate 30. On first side 30_A of second plane-parallel plate 30, measuring beam M then strikes a further reflector 30.8, via which it is reflected again in the direction of a transmissive deflection grating 20.3 on second side 20_B of first plane-parallel plate 20. From deflection grating 20.3, measuring beam M is then reflected twice via two further reflectors 20.4, 20.2 (reflection now on back side) and propagates in the direction of a second imaging optical system in first plane-parallel plate 20.

The second imaging optical system for measuring beam M includes a third grating lens 20.5 disposed in intermediate plane ZE and having focal length 2f, a second reflector 20.6, and a fourth grating lens 20.9 located in recombining plane VE and having focal length f. Like first and second grating lenses 30.2, 30.7 of the first imaging optical system, third and fourth grating lenses 20.5, 20.9 take the form of reflection grating lenses. Thus, a displacement of measuring beam M from intermediate plane ZE to recombining plane VE results via the second imaging optical system. In addition, because of focal lengths 2f, f selected for the two grating lenses 20.5, 20.9, the beam diameter of measuring beam M is halved, so that after passing through fourth grating lens 20.9, it again has the original entrance-beam diameter.

As illustrated in FIG. 1c, measuring beam M then propagates in recombining plane VE via reflectors 20.2, 20.4, transmissive deflection grating 20.3 and reflectors 30.8, 20.2 in the direction of first beam splitter 30.1. It allows measuring beam M to transmit, so that it propagates a third time in the direction of measuring reflector 40. After impinging on measuring reflector 40 a third time and again passing twice through λ/4-plate 70, because of the change again in its state of polarization, at first beam splitter 30.1, measuring beam M is finally reflected in the direction of detection unit 60.

The basic beam path of measuring beam M in the measuring arm of the first exemplary embodiment of the interferometer may thus be summarized as follows: measuring beam M generated via first beam splitter 30.1 strikes measuring reflector 40 a first time, and after the first reflection back in the two plane-parallel plates 20, 30, is displaced via the first imaging optical system in second plane-parallel plate 30 from splitting plane AE to intermediate plane ZE; at the same time, a doubling of the beam diameter results. Measuring beam M then arrives, with normal incidence, a second time at measuring reflector 40, and is reflected back again to the two plane-parallel plates 20, 30. Via the second imaging optical system in first plane-parallel plate 20, a displacement of measuring beam M to recombining plane VE then results. In the process, the doubled beam diameter is reduced or halved again back to the original entrance-beam diameter. Measuring beam M then strikes measuring reflector 40 a third time, is reflected by it and then propagates via beam splitter 30.1 in the direction of detection unit 60.

The beam-path guidance in the interferometer ensures that even in the event of a possible tilting of measuring reflector 40 out of its nominal position, no beam shears, i.e., neither angle shears nor location shears, result in measuring beam M. Such beam shears would cause a dip in intensity and loss in the degree of modulation in the distance signals generated. Rather, possible tilting of measuring reflector 40 is compensated for automatically via the beam path provided for measuring beam M, since it is thereby ensured that in the second impingement on measuring reflector 40, measuring beam M always falls with normal incidence. Thus, upon the first impingement on measuring reflector 40 tilted by an angle $\alpha$, measuring beam M would be deviated through angle $2\alpha$. In this context, the beam diameter is doubled via the first imaging optical system, but the angle of emergence from the first imaging optical system is halved, that is, measuring beam M leaves the first imaging optical system at angle of emergence $\alpha$. Consequently, it is ensured that in the second impingement, measuring beam M always falls with normal incidence on measuring reflector M, and after the reflection has taken place, is able to propagate back upon itself quasi on the path of incidence.

In splitting plane AE, according to FIG. 1a, reference beam R generated at first beam splitter 30.1 is reflected in the direction of first plane-parallel plate 20. There, it strikes reflector 20.1 on first side 20_A of this plane-parallel plate 20. This results in a reflection of reference beam R back in the direction of second plane-parallel plate 30, where reference beam R strikes a further second beam splitter 30.4, that is disposed on first side 30_A of second plane-parallel plate 30 and likewise takes the form of a polarization-optical beam-splitter layer. In principle, starting from second beam splitter 30.4, the further beam path of reference beam R in the reference arm is identical to the beam path of measuring beam M in the reference arm starting from first beam splitter 30.1. Thus, reference beam R transmitted by second beam splitter 30.4 propagates a first time along the measuring direction and parallel to the measuring beam in the direction of reference reflector 50. From there, it is reflected back, and because of passing twice through $\lambda$/4-plate 80, is reflected by second beam splitter 30.4 on second plane-parallel plate 30 in the direction of a third imaging optical system. Analogous to the first imaging optical system in the measuring arm, the third imaging optical system includes a fifth grating lens 30.5 in splitting plane AE, a third reflector 30.6, as well as a sixth grating lens 30.9 in intermediate plane ZE (FIG. 1b). Fifth grating lens 30.5 has focal length f, sixth grating lens 30.9 has focal length 2f doubled in comparison. Via this imaging optical system, a displacement from splitting plane AE to intermediate plane ZE likewise results for reference beam R. In addition, the entrance-beam diameter of reference beam R is doubled.

As illustrated in the beam-path representation of intermediate plane ZE in FIG. 1b, after the reflection at second grating lens 30.9, reference beam R strikes second beam splitter 30.4 again, and is thereby reflected in the direction of reference reflector 50, on which it then falls with normal incidence in the second impingement. After the reflection back and the again twice traversal of $\lambda$/4-plate 80, second beam splitter 30.4 then allows reference beam R to pass through in the direction of first plane-parallel plate 20. In first plane-parallel plate 20, reference beam R then strikes a fourth imaging optical system that includes a seventh grating lens 20.7 in intermediate plane ZE, a fourth reflector 20.8, and an eighth grating lens 20.11 in the recombining plane (FIG. 1c). Seventh grating lens 20.7 has focal length 2f, and eighth grating lens 20.11 has focal length f halved in comparison. Analogous to the beam path in the measuring arm and the second imaging optical system provided there, a displacement of reference beam R thereby results from intermediate plane ZE to recombining plane VE, while at the same time, the beam diameter of reference beam R is again reduced or halved.

Thus, analogous to measuring beam M, via the beam path explained and here, in particular, because of the optical power of the third imaging optical system, it is also ensured for reference beam R that it strikes with normal incidence on reference reflector 50 during the second impingement and propagates back upon itself. Consequently, unwanted angle shears and location shears between measuring beam M and reference beam R may be avoided.

Subsequent to the reflection at eighth grating lens 20.11 in the direction of second plane-parallel plate 30, reference beam R propagates through second beam splitter 30.4 a third time in the direction of reference reflector 50. After the third reflection back and the again twice traversal of $\lambda$/4-plate 80, reference beam R is reflected at second beam splitter 30.4 in the direction of a further reflector 30.10 on second side 30_B of second plane-parallel plate 30. From this reflector 30.10, reference beam R is reflected in the direction of first plane-parallel plate 20, and strikes there on reflector 20.10 which is located on second side 20_B of the first plane-parallel plate. From there, reference beam R is then finally deflected in the direction of first beam splitter 30.1 on second plane-parallel plate 30, and comes here to interfering superposition with measuring beam M at the recombining location. In this context, reference beam R passes through first beam splitter 30.1, and then propagates interferingly together with measuring beam M in the direction of detection unit 60.

Because of the beam-path guidance analogous in principle to the measuring arm, it is also ensured for reference beam R propagating in the reference arm that possible tilting of reference reflector 50 out of its nominal position causes no beam shears which negatively affect the distance signals generated.

Because of the various optical elements on sides of the two plane-parallel plates 20, 30, it is thus ensured in the interferometer that due to their optical effect on measuring beam M and reference beam R, these beams propagate parallel to one another along measuring direction MR in the direction of measuring reflector 40 and reference reflector 50, respectively.

In the first exemplary embodiment of the interferometer, the beam-path guidance in the reference arm ensures that the measuring arm and the reference arm extend in parallel and spatially separate from each other, to in this manner be able to accomplish the corresponding measuring task. To that end, reference beam R traverses the additional optical path between first beam splitter 30.1 via reflector 20.1 to second beam splitter 30.4 two times. Without additional measures, the result of this would be that the optical paths traversed by reference beam R in the reference arm would be longer than those of measuring beam M in the measuring arm. In the event of temperature changes, the different optical path lengths in the measuring arm and reference arm may result in errors in the position determination, since measuring and reference beams M, R are influenced differently by such temperature changes. Therefore, by forming a suitable delay section in the measuring arm, it is possible to ensure that between splitting and recombining with reference beam R, measuring beam M in the measuring arm passes through the same optical travel distance in air and in plane-parallel plates 20, 30 as reference beam R. In the first exemplary embodiment of the interferometer, the corresponding delay section is formed by the additionally inserted optical path of measuring beam M between reflectors 20.2, 30.8, 20.3, 20.4, and 20.2. The optical path length traveled on this delay section corresponds exactly to the optical path length in reference beam R, which results due to the spatial separation of the measuring arm and reference arm indicated above.

On the other hand, if, in configuring a corresponding interferometer, greater value is placed on the most compact construction of it as possible rather than on the compensation of thermally caused errors, then it is also possible to do without the provision of such a delay section in the measuring arm. Accordingly, the delay section is not absolutely necessary in the interferometer.

After recombining at the recombining location, i.e., at first beam splitter 30.1, interfering measuring and reference beams M, R propagate in the direction of detection unit 60. At least one first distance signal with regard to the position of object to be measured 41 is ascertainable via detection unit 60 from again superposed and interfering measuring and reference beams M, R.

There are various possibilities with regard to the construction of detection unit 60, which are described only briefly below.

Detection unit 60 may include a λ/4-plate on the input side. Downstream of it is a splitting grating that splits the light falling on it into three beams of rays of equal intensity. In the beam paths of each of these split beams of rays, a polarization filter is disposed, their polarization directions in each case being rotated by 120° relative to each other. In turn, downstream of the polarization filters is, in each instance, an electro-optical detector element. Ultimately resulting at them are three distance signals phase-shifted by 120°, which are able to be further processed by the respective sequential electronics.

In addition, other variants of detection units 60 may also be used to generate a plurality of phase-shifted distance signals from two collinearly superposed, orthogonally polarized, partial beams of rays.

For reasons of better clarity, FIGS. 1a to 1d do not show a spacer, which may be arranged between the two plane-parallel plates 20, 30, and which ensures a defined distance between plane-parallel plates 20, 30. For example, a transparent glass plate having a thickness that corresponds to the distance necessary between the two plane-parallel plates 20, 30, e.g., made of Zerodur, is suitable as a spacer. The glass plate may include cutouts in those areas in which measuring and reference beams M, R propagate between the two plane-parallel plates 20, 30.

An interferometer according to a second example embodiment of the present invention is explained with reference to FIGS. 4a to 4d and 5a to 5c. The representations of the beam paths in these Figures correspond to those of the first exemplary embodiment. Primarily the consequential differences from the first exemplary embodiment are described in more detail below.

One difference in the second exemplary embodiment is that, instead of two transparent plane-parallel plates having a thickness in the range of 1 to 2 cm, three very thin plane-parallel plates 120, 125, 130 are provided. They are referred to hereinafter as first plane-parallel plate 120, second plane-parallel plate 125, and third plane-parallel plate 130. It should be pointed out as a special advantage of such an arrangement that plane-parallel plates 120, 125, 130 provided may be produced particularly economically on thin glass substrates, e.g., with the aid of a semiconductor lithography machine. In addition, a lesser thickness of the plane-parallel plate configuration may thereby be provided, which may be advantageous in the event a compact construction is required.

The thickness of such thin plane-parallel plates 120, 125, 130 may be in the range of, for example, 0.5 to 3 mm. The dimensions of thin plane-parallel plates 120, 125, 130 along the x-direction and y-direction correspond to the dimensions of plane-parallel plates 20, 30 from the first exemplary embodiment.

As in the first exemplary embodiment, between the three plane-parallel plates 120, 125, 130, spacers are arranged which have corresponding cutouts in the area of the beams of rays propagating between plane-parallel plates 120, 125, 130. For reasons of clarity, these spacers are again not shown in FIGS. 4a to 4d.

The beam path of beam of rays S emitted by light source 110, the beam paths of measuring and reference beams M, R in the measuring arm and reference arm, and the beam path after the recombination correspond in principle to the beam paths from the first exemplary embodiment. Instead of a detailed explanation of them again, only the beam paths in the measuring arm and reference arm between splitting and recombination are therefore described below in the form of light-course diagrams. The reference numerals used in this connection are set forth in FIGS. 4a to 4d and 5a to 5c.

Beam Path of Measuring Beam M in the Measuring Arm

First beam splitter 125.1→λ/4-plate 170→measuring reflector 140 (first reflection)→λ/4-plate 170→first beam splitter 125.1 (reflection)→reflector 130.1→reflector 125.2 (reflection on top side)→first imaging optical system, which includes first grating lens 130.2 having focal length f (in splitting plane AE), first reflector 125.3, second grating lens 130.4 having focal length 2f (in intermediate plane ZE)→reflector reflector 125.2 (reflection on top side)→reflector 130.1→first beam splitter 125.1 (reflection)→λ/4-plate 170→measuring reflector 140 (second reflection, normal incidence)→λ/4-plate 170→first beam splitter 125.1 (transmission)→reflector 120.3→reflector 125.2 (reflection on bottom side)→second imaging optical system, which includes third grating lens 120.4 having focal length 2f (in intermediate plane ZE), second reflector 125.6, fourth grating lens 120.5 having focal length f (in recombining plane VE)→reflector 125.2 (reflection on bottom side)→reflector 120.3→first beam splitter 125.1 (transmission)→λ/4-plate 170→measuring reflector 140 (third reflection)→λ/4-plate 170→ first beam splitter 125.1.

Beam Path of Reference Beam R in the Reference Arm

First beam splitter 125.1→reflector 120.1→reflector 125.4→reflector 120.2→second beam splitter 125.5 (transmission)→λ/4-plate 180→reference reflector 150 (first reflection)→λ/4-plate 180→second beam splitter 125.5 (reflection)→third imaging optical system, which includes fifth grating lens 130.3 having focal length f (in splitting plane AE), third reflector 125.7, sixth grating lens 130.5 having focal length 2f (in intermediate plane ZE)→second beam splitter 125.5 (reflection)→λ4-plate 180→reference reflector 150 (second reflection, normal incidence)→λ4-plate 180→second beam splitter 125.5 (transmission)→fourth imaging optical system, which includes seventh grating lens 120.6 having focal length 2f (in intermediate plane ZE), fourth reflector 125.8, eighth grating lens 120.8 having focal length 2f (in recombining plane VE)→second beam splitter 125.5 (transmission)→λ/4-plate 180→ reference reflector 150 (third reflection)→λ/4-plate 180 second beam splitter 125.5 (reflection)→reflector 130.6→reflector 120.7→first beam splitter 125.1.

The optical effects of the various imaging optical systems on measuring beam M and reference beam R correspond to the optical effects of the respective analogous imaging optical systems from the first exemplary embodiment. Thus, the intrinsic compensation of possible tilting of the measuring reflector and/or reference reflector is ensured in this exemplary embodiment, as well.

In addition to the two exemplary embodiments explained, there are additional and alternative possibilities within the spirit and scope hereof.

For example, a hybrid of the interferometer of the first and second exemplary embodiments may be provided. In that case, four thin plane-parallel plates may be used, for example, which, analogous to the construction of the first exemplary embodiment, are disposed in the planes where the boundary surfaces glass-air or air-glass of the two thicker plane-parallel plates are arranged, etc.

What is claimed is:

1. An interferometer, comprising
a light source adapted to emit a beam of rays;
a first beam splitter adapted to split the beam of rays, emitted by the light source, into at least one measuring beam and at least one reference beam, to define a splitting plane, the measuring beam adapted to propagate in a measuring arm and the reference beam adapted to propagate in a reference arm until being recombined at a recombining location in a recombining plane, the recombining plane being oriented parallel to the splitting plane;
a reference reflector arranged in the reference arm so that the reference beam impinges at least three times on the reference reflector;
a measuring reflector arranged in the measuring arm and adapted to be joined to an object to be measured, that is movable along a measuring direction relative to the reference reflector, so that the measuring beam impinges at least three times on the measuring reflector;
a detection unit adapted to ascertain at least one distance signal with regard to a position of the object to be measured from interfering measuring and reference beams superposed at the recombining location;
at least two transparent plane-parallel plates arranged parallel to each other in the beam path between the light source and the detection unit, the first beam splitter being integrated in one of the plane parallel plates, at least the measuring reflector being movable relative to the plane-parallel plates along the measuring direction, each plane-parallel plate including a plurality of optical elements adapted to impart an optical effect on the measuring beam and the reference beam such that the measuring beam and the reference beam propagate parallel between (a) the plane-parallel plate that is located adjacent to the reference and measuring reflectors and (b) the reference and measuring reflectors;
wherein the optical elements in the two plane-parallel plates include a plurality of reflectors and at least four imaging optical systems for the measuring beam and the reference beam;
wherein two imaging optical systems in each case are adapted to displace the measuring beam and the reference beam from the splitting plane to an intermediate plane that is located between, and oriented parallel to, the splitting plane and the recombining plane; and
wherein two further imaging optical systems in each case are adapted to displace the measuring beam and the reference beam from the intermediate plane to the recombining plane.

2. The interferometer according to claim 1, wherein the interferometer includes a first plane-parallel plate and a second plane-parallel plate, and wherein:
a first imaging optical system for the measuring beam is arranged in the second plane-parallel plate;
a second imaging optical system for the measuring beam is arranged in the first plane-parallel plate;
a third imaging optical system for the reference beam is arranged in the second plane-parallel plate;
a fourth imaging optical system for the reference beam is arranged in the first plane-parallel plate;
the first and third imaging optical systems are adapted to increase an entrance-beam diameter of the beam of rays impinging thereon; and
the second and fourth imaging optical systems are adapted to reduce a beam diameter of the beam of rays impinging thereon to the entrance-beam diameter.

3. The interferometer according to claim 2, wherein each imaging optical system includes two reflective grating lenses arranged on one side of a plane-parallel plate, and a reflector arranged on an opposite side of the plane-parallel plate, reflecting sides of the grating lenses and of the reflector facing one another.

4. The interferometer according to claim 3, wherein:
the first imaging optical system includes:
a first grating lens and a second grating lens, both arranged on one side of the second plane-parallel plate; and
a first reflector arranged on the opposite side of the second plane-parallel plate;
the first imaging optical system is adapted to double the entrance-beam diameter of the measuring beam impinging thereon;
the second imaging optical system includes:
a third grating lens and a fourth grating lens, both arranged on one side of the first plane-parallel plate; and
a second reflector arranged on the opposite side of the first plane-parallel plate;
the second imaging optical system is adapted to halve the beam diameter of the measuring beam impinging thereon;
the third imaging optical system includes:

a fifth grating lens and a sixth grating lens, both arranged on one side of the second plane-parallel plate; and a third reflector arranged on the opposite side of the second plane-parallel plate;

the third imaging optical system is adapted to double the entrance-beam diameter of the reference beam impinging thereon; and the fourth imaging optical system includes:

a seventh grating lens and an eighth grating lens, both arranged on one side of the first plane-parallel plate; and a fourth reflector arranged on the opposite side of the first plane-parallel plate; and the fourth imaging optical system is adapted to halve the beam diameter of the reference beam impinging thereon.

5. The interferometer according to claim 4, wherein each of the first, fourth, fifth, and eighth grating lenses has a first focal length, and each of the second, third, sixth, and seventh grating lenses has a second focal length, which is twice the first focal length.

6. The interferometer according to claim 3, wherein the interferometer includes a first plane-parallel plate, a second plane-parallel plate, and a third plane-parallel plate, the plane-parallel plates set apart in the beam propagation direction, and wherein:

a first imaging optical system for the measuring beam is arranged in the second and third plane-parallel plates;

a second imaging optical system for the measuring beam is arranged in the second and third plane-parallel plates;

a third imaging optical system for the reference beam is arranged in the first and second plane-parallel plates;

a fourth imaging optical system for the reference beam is arranged in the first and second plane-parallel plates;

the first and third imaging optical systems are adapted to increase an entrance-beam diameter of the beam of rays impinging thereon; and the second and fourth imaging optical systems are adapted to reduce a beam diameter of the beam of rays impinging thereon to the entrance-beam diameter.

7. The interferometer according to claim 6, wherein each imaging optical system includes two reflective grating lenses arranged on one plane-parallel plate and a reflector arranged on an opposite plane-parallel plate, reflecting sides of the grating lenses and of the reflector facing one another.

8. The interferometer according to claim 7, wherein:

the first imaging optical system includes:

a first grating lens and a second grating lens, both arranged on the third plane-parallel plate; and a first reflector arranged on the second plane-parallel plate;

the first imaging optical system is adapted to double the entrance-beam diameter of the measuring beam impinging thereon;

the second imaging optical system includes:

a third grating lens and a fourth grating lens, both arranged on the first plane-parallel plate; and a second reflector arranged on the second plane-parallel plate;

the second imaging optical system is adapted to halve the beam diameter of the measuring beam impinging thereon;

the third imaging optical system includes:

a fifth grating lens and a sixth grating lens, both arranged on the third plane-parallel plate; and a third reflector arranged on the second plane-parallel plate;

the third imaging optical system is adapted to double the entrance-beam diameter of the reference beam impinging thereon;

the fourth imaging optical system includes:

a seventh grating lens and an eighth grating lens, both arranged on the first plane-parallel plate; and a fourth reflector arranged on the second plane-parallel plate; and the fourth imaging optical system is adapted to halve the beam diameter of the reference beam impinging thereon.

9. The interferometer according to claim 8, wherein each of the first, fourth, fifth, and eighth grating lenses has a first focal length, and each of the second, third, sixth, and seventh grating lenses has a second focal length, which is twice the first focal length.

10. The interferometer according to claim 1, wherein the first beam splitter, arranged on a second plane-parallel plate, includes a grating and/or a polarization-optical beam-splitter layer, arranged on a side of the second plane-parallel plate facing a first plane-parallel plate.

11. The interferometer according to claim 1, wherein each of the measuring reflector and the reference reflector includes a plane-mirror reflector.

12. The interferometer according to claim 1, further comprising a delay section arranged in the beam path of the measuring beam and adapted such that between being split and being recombined, the measuring beam and the reference beam traverse identical optical travel distances in air and in the plane-parallel plates.

13. The interferometer according to claim 1, wherein:

in a second impingement, the measuring beam impinges with normal incidence onto the measuring reflector; and in a second impingement, the reference beam impinges with normal incidence onto the reference reflector.

14. The interferometer according to claim 1, further comprising spacers arranged between the plane-parallel plates, the spacers including cutouts in areas of the measuring and reference beams propagating between the plane-parallel plates.

15. An interferometer, comprising a light source adapted to emit a beam of rays;

a first beam splitter adapted to split the beam of rays, emitted by the light source, into at least one measuring beam and at least one reference beam, to define a splitting plane, the measuring beam adapted to propagate in a measuring arm and the reference beam adapted to propagate in a reference arm until being recombined at a recombining location in a recombining plane, the recombining plane being oriented parallel to the splitting plane;

a reference reflector arranged in the reference arm so that the reference beam impinges at least three times on the reference reflector;

a measuring reflector arranged in the measuring arm and adapted to be joined to an object to be measured, that is movable along a measuring direction relative to the reference reflector, so that the measuring beam impinges at least three times on the measuring reflector;

a detector adapted to ascertain at least one distance signal with regard to a position of the object to be measured from interfering measuring and reference beams superposed at the recombining location;

at least two transparent plane-parallel plates arranged parallel to each other in the beam path between the light source and the detector, the first beam splitter being integrated in one of the plane parallel plates, at least the measuring reflector being movable relative to the plane-parallel plates along the measuring direction, each plane-parallel plate including a plurality of optical elements adapted to impart an optical effect on the measuring beam and the reference beam such that the measuring beam and the reference beam propagate parallel between (a) the plane-parallel plate that is located adjacent to the reference and measuring reflectors and (b) the reference and measuring reflectors;

wherein the optical elements in the two plane-parallel plates include a plurality of reflectors and at least four imaging optical systems for the measuring beam and the reference beam;

wherein two imaging optical systems in each case are adapted to displace the measuring beam and the reference beam from the splitting plane to an intermediate plane that is located between, and oriented parallel to, the splitting plane and the recombining plane; and wherein two further imaging optical systems in each case are adapted to displace the measuring beam and the reference beam from the intermediate plane to the recombining plane.

* * * * *